United States Patent [19]

Robers

[11] Patent Number: 4,825,306

[45] Date of Patent: Apr. 25, 1989

[54] VIDEO TRANSLATION SYSTEM FOR TRANSLATING A BINARY CODED DATA SIGNAL INTO A VIDEO SIGNAL AND VICE-VERSA

[75] Inventor: Klaas H. J. Robers, Eindhoven, Netherlands

[73] Assignee: U.S. Philips Corporation, New York, N.Y.

[21] Appl. No.: 24,902

[22] Filed: Mar. 10, 1987

Related U.S. Application Data

[63] Continuation of Ser. No. 634,902, Jul. 26, 1984, abandoned.

[30] Foreign Application Priority Data

Aug. 8, 1983 [NL] Netherlands .......................... 8302787

[51] Int. Cl.$^4$ .............................................. H04N 5/78
[52] U.S. Cl. ..................................... 360/9.1; 360/33.1; 360/53; 360/54; 358/142; 371/69
[58] Field of Search ................. 360/8, 9.1, 32, 19.1, 360/32, 53, 54, 51; 371/69; 358/142, 145, 143

[56] References Cited

U.S. PATENT DOCUMENTS

| | | | |
|---|---|---|---|
| 4,016,547 | 4/1977 | Page | 360/54 X |
| 4,135,205 | 6/1979 | Takahashi | 360/19.1 X |
| 4,233,627 | 11/1980 | Sugihara | 358/145 X |
| 4,333,108 | 6/1982 | Quan et al. | 358/145 |
| 4,353,129 | 10/1982 | Nishiwaki | 360/54 X |
| 4,375,101 | 2/1983 | Cerracchio | 371/69 |
| 4,429,332 | 6/1984 | Pargee, Jr. | 358/143 |
| 4,542,406 | 9/1985 | Shimoyama et al. | 358/143 VB |
| 4,544,950 | 10/1985 | Tu | 358/143 |

OTHER PUBLICATIONS

Search Report pg. of EP 84-20-1126.
SMPTE, Journal, vol. 90, Feb. 81, p. 113+; Foerster et al, "Digital Video Recording in the 625-Line System" in Ex's File.
NASA Tech. Briefs, Spring 79, vol. 4, No. 1, pp. 19-20: Hopkins "TV Audio & Video in the Same Channel" in 360/19.1.
Audio Engr. Society, Journal, vol. 26, No. 7/8, Jul.-/Aug. 78; p. 549+; Willcocks "Sme Notes on Digital Audio Topics" in 360/32.
Mini-Micro Systems, vol. 16, No. 4, Apr. 1983, pp. 179-182, Denver, U.S.; J. Proper, "Video Cassette Recorders for Disk Backup".

Primary Examiner—Aristotelis M. Psitos

[57] ABSTRACT

The binary coded data signal is divided into data blocks in the video translation system in accordance with the invention n copies are made of each data block. Televison synchronization signals are added to the original data block and to the n copies thereof, the assembly thus forming a video data block. This video data block is transferred to a video processing device, for example, a video recorder in which it is recorded. When the video data block is recovered, the corresponding data block is recovered from the n+1 data blocks present.

7 Claims, 2 Drawing Sheets

VIDEO TRANSLATION SYSTEM FOR TRANSLATING A BINARY CODED DATA SIGNAL INTO A VIDEO SIGNAL AND VICE-VERSA

This is a continuation of application Ser. No. 634,902, filed July 26, 1984, now abandoned.

The invention relates to a video translation system comprising a first device for translating a binary coded data signal into a video signal, and a second device for translating a video signal into a binary coded data signal.

The video translation system comprises a first connection terminal for the exchange of binary coded data with an external data source, and a second connection terminal for connection of an external video signal processing device. The first device comprises a system of registers which is connected to the first connection terminal for receiving the data signal in the form of successive data blocks and for the temporary storage of one data block at a time. The first device further comprises a sync signal input for receiving television synchronization signals, and a mixer which comprises a first input which is connected to an output of the system of registers, and a second input for receiving the television synchronization signals. The mixer is provided with a data block and at least one television synchronization signal and generates video data blocks therefrom. The system of registers further comprises means for generating an integer number of n copies of the original data block. The television synchronization signal is added in synchronism to each of these copies and together from the video data block containing the original data block. An output of the mixer is connected to the second connection terminal in order to output video data blocks.

The second device comprises a synchronization signal separating device for separating the television synchronization signals from a video signal applied to the second connection terminal. The second device further comprises a recovery circuit for recovering the corresponding data block from n+1 data blocks forming part of the video data block presented.

A video translation system of this kind is known from European patent application No. 0 048 779, corresponding to Cerrachio (U.S. Pat. No. 4,375,101). In the video translation system disclosed in the said European patent application No. 0 048 779 the first device extracts a data block from a data signal presented by a data source. The data block is temporarily stored in a system of registers. This data block is copied n times in the system of registers. These copies are made in order to achieve a substantial reduction in the risk of incorrect transfer and storage of the data block concerned in the video signal processing device. Subsequently, the original data block and the n copies are transferred to a mixer in which television synchronization signals are added to the data block and the copies thereof in order to form a video data block. The video data block thus formed is outputted on the second connection terminal to which a video recorder is connected. The video data block is then recorded by the video recorder in a known manner.

The second device ensures that a data block is extracted again from the video data block recorded by the video recorder. To this end, the second device comprises inter alia a synchronization signal separating device which separates the television synchronization signals from the video signal presented by the video recorder. The second device also comprises a recovery circuit for recovering the corresponding data block from n+1 data blocks on the basis of a majority decision. The recovered data block is outputted to a terminal station. A video recorder is thus used for the storage of binary data, for example from a computer . . . .

However, it is a drawback of the known video translation system that the data block is not recovered in synchronism with the television synchronization signal. Consequently, recovery requires a large amount of processing time; this has an adverse effect on the amount of data which can be stored in the storage means per unit of surface area.

It is the object of the invention to provide a video translation system in which said drawback is mitigated.

To this end, a video translation system in accordance with the invention is characterized in that the recovery circuit comprises circuit means for performing this recovery in synchronism with the extracted television synchronization signals. Because the corresponding data block is recovered in synchronism with the extracted television synchronization signal, the recovery will be faster and the construction of the recovery circuit will also be simpler. The television synchronization signal is supplied by the synchronization signal separating device. Moreover, this is a highly reliable signal which benefits the proper operation of the recovery circuit. The fast recovery has a favorable effect on the amount of data to be stored. This amount is larger, because less processing time is required for the recovery.

In a first preferred embodiment of the video translation system in accordance with the invention, the recovery circuit comprises a majority decision circuit. This first preferred embodiment is characterized in that an output of the synchronization signal separating device is connected to an input of a for clock pulse regenerator generating shift pulses an synchronism with the synchronization signals. The second device further comprises a shift register, a data input of which is connected to the second connection terminal. The shift register comprises at least b sub-outputs, each of which is connected to a separate input of the majority decisiion circuit. The shift register further comprises at least one control input. It is provided in order to shift, under the control of first shift pulses, at least n data blocks from the video data block presented into the shift register and to activate the n sub-outputs under the control of a second shift pulse. The first and second shift pulses appearing successively in time. Thus, from the n+1 data blocks presented to the recovery circuit a correct data block is recovered on a "most votes count" basis. Because the shift pulses are generated in synchronism with the synchronization signal, the sampling pulses can be simply extracted from the video signal. Moreover, the construction of the majority decision circuit may thus be simple.

Preferably, the majority decision circuit deterimines bit-wise a corresponding bit value from n+1 bits presented on a majority basis. Because the majority decision circuit operates at the bit level, it can be simply implemented.

In a further preferred embodiment of a video translation system in accordance with the invention, the sync input is connected to a synchronization signal generator. An output of this generator is connected to an input of a divider for generating control signals on the basis of the synchronization signals. This further embodiment is characterized in that the system of registers comprising an input register having its data outputs connected in parallel to data inputs of an end-around coupled register. The end-around coupled register has a serial) output connected to the third input of the mixer as well as to a second data input of the end-around coupled register. The end-around coupled register also has a control input which is connected to an output of the divider. The end-around coupled register is provided a first control signal in order to take over the data block from the input register a second control signal and to make the n copies by the repeated loading of the data block via the second data input. Because the control signals are generated on the basis of the synchronization signals, no separate clock is required for generating the control signals. Moreover, inter alia because of the use of the end-around coupled register, viewed over the entire video signal, the bits of the video data block occupy substantially the same location with respect to a single television line. The latter is attractive for the recovery of the data.

A second preferred embodiment of a video translation system in accordance with the invention is characterized in that the recovery circuit comprises a majority decision circuit for said recovery of the corresponding data block. A correct data block is thus bit-wise recovered from the n+1 data blocks presented on the basis of a "most votes" count. Furthermore, such a majority of decision circuit represents an attractive solution in view of the rate at which the bits are presented to the second connection terminal.

Preferably, an output of the synchronization signal separating device is connected to an input of a shift pulse generator for generating shift pulses in synchronism with the synchronization signal. The second device further comprises a shift register, a data input of which is connected to the second connection terminal. The shift register comprises at least n sub-outputs, each of which is connected to a separate input of the majority decision circuit. The shift register furthermore comprises at least one control input. It is provided in order to shift, under the control of first shift pulses, at least n data blocks from the video data block presented into the shift register and to activate the n sub-outputs under the control of a second shift pulse. The first and second shift pulses appearing successively in time. Because the shift pulses are generated in synchronism with the synchronization signal, the sampling pulses can be simply extracted from the video signal. Moreover, the construction of the majority decision circuit may thus be simple.

A further preferred embodiment of a video translation system in accordance with the invention is characterized in that the majority decision circuit comprises an error signal output for supplying an error signal which indicates an error in a data block. Because an error signal is supplied, it can be used to correct a bit error in cooperation with an error register.

Preferably, the majority decision circuit determines bit-wise a corresponding bit value from n+1 bits presented on a majority basis. Because the majority decision circuit operates at the bit level, it can be simply implemented.

Preferably, a data block contains data for one television line, the video data block containing video data for n+1 successive television lines. The capacity of the system of registers and the shift register may thus remain limited and, moreover, the system is protected against drop-outs in the longitudinal direction of the video tape.

Preferably, the shift register comprises n serially interconnected delay elements, each delay element comprising a control input and an output which is connected to the majority decision circuit. By choosing the number of delay elements to be equal to the number of copies and because each delay element is provided with a control input, a shift register is obtained which can be simply controlled for this system.

The invention will be described in detail hereinafter with reference to the drawing, therein:

FIG. 2 shows an example of a data block with an associated recognition pattern;

Figure 1:
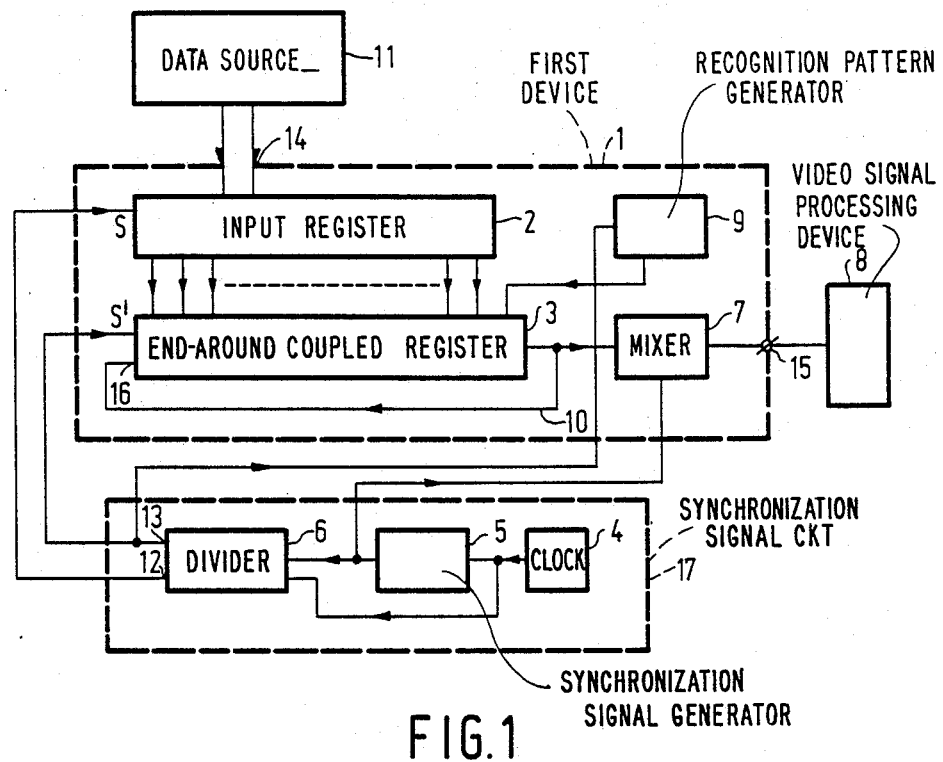

FIG. 1 shows an embodiment of a device for translating a binary coded data signal into a video signal, the device forming part of a video translation system in accordance with the invention. The device 1 comprises a first connection terminal 14 for the connection to it of a data source 11, for example a computer or a data processing system.

The first connection terminal 14 is connected to an input of a system of registers which comprises an input register 2 and an end-around coupled register 3. The data outputs of the input register 2 are connected to the parallel data inputs of the end-around coupled register 3. The input register and the end-around coupled register comprise respective control inputs (S and S'). A serial data output of the end-around coupled register 3 is connected to a first input of a mixer 7 and also to a serial data input 16 of the end-around coupled register 3. The device 1 furthermore comprises a recognition pattern generator 9, an output of which is connected to a parallel data input of the end-around coupled register 3. An output of the mixer 7 is connected to a second connection terminal 15 to which a video signal processing device 8, for example a video recorder, is connected.

The device 1 cooperates with a synchronization signal circuit 17. The synchronization signal circuit 17 in the present embodiment comprises a clock 4, an output of which is connected to a synchronization signal generator 5 and also to a first input of a divider 6. The synchronization signal generator 5 is of a type known per se and generates, on the basis of the clock pulses supplied by the clock 4, television synchronization signal which are presented to a second input of the mixer 7 and to a second input of the divider 6. The divider 6 inter alia generates first control signals and second control signals which are outputted on a first output 12 and at a second output 13, respectively. The first output 12 is connected to the control input S of the input register 2. The second output 13 is connected to the control input S' of the end-around coupled register 3 and also to a control input of the rocognition pattern generator 9. It is alternatively possible to incorporate the synchronization signal circuit 17 completely or partly (for example, only the divider 6) in the device. It is also possible to supply the television synchronization signals from an external source; in that case the synchronization signal circuit 17 does not include a clock 4 or a synchronization signal generator 5.

In the present embodiment, 16 bytes (128 bits) of the data supplied by the data source 11 are dealt with per television line. This data is coded, for example according to an NRZ-code. Furthermore, the data of one and the same television line is repeated n times in the same frame in order to reduce the risk of incorrect data. In the present example n equal 4. n is preferably an even number (n+1=total number of times that the same data is written, is then odd) for reasons which will be described hereinafter. The repeating of the data of one and the same television line within the same frame relates to the fact that the video signal is recorded in a spatially spread manner during recording on a video tape. Consequently, the adverse effects of large characteristic dropouts on the magnetic tape are substantially reduced. Evidently, this represents only a preferred solution and there are other ways of repeating the data, for example, repeating a complete frame n times; however, the latter solution necessitates a very high capacity of the input register as well as of the end-around coupled register.

The data supplied by the data source 11 is shifted into the input register 2 under the control of a first control signal which appears on the first output 12 of the divider 6. The input register 2 of the present embodiment has a capacity for the storage of a data block containing 16 bytes. The first control signal has a frequency which is determined taking into account on the one hand the rate at which the data is outputted by the data source 11 and on the other hand the fact that the input register must be filled within the duration of n+1 successive television lines.

Under the control of a control pulse which appears on the second output 13 of the divider 6, the data block (one television line) is transferred from the input register 2 to the end-around coupled video register 3. This control pulse is generated each time after the reception of n+1 successive horizontal synchronization pulses (determined for example by means of a counter). Between each two successive horizontal synchronization pulses, a second control signal which is composed of 128 shift pulses is outputted on the second output 13 of the divider 6. Under the control of these 128 shift pulses, the data block present in the end-around coupled register 3 is shifted to the mixer 7 and also back into the register 3 again via the feedback line 10 and the serial data input 16. The shifting into the end-around coupled register 3 is reported n+1 times for each television line presented. It is thus achieved that n-copies are made of the data block from the data source. In response to the n+1$^{th}$ horizontal synchronization pulse, however, a next data block is fetched from the input register 2 under the control of the next control pulse. The next data block erases the preceding data block still present in the end-around coupled register 3.

The mixer 7 adds television synchronization signals to each data block presented, thus forming a video signal. The original data block, the n copies thereof and the added synchronization signals together form a video data block. The video data block is presented to the video signal processing device 8 in a manner customarily used for video signals. For example, a bit having the bit value logic "0" is recorded as block, and a bit having the bit value logic "1" is recorded as white.

Figure 2:
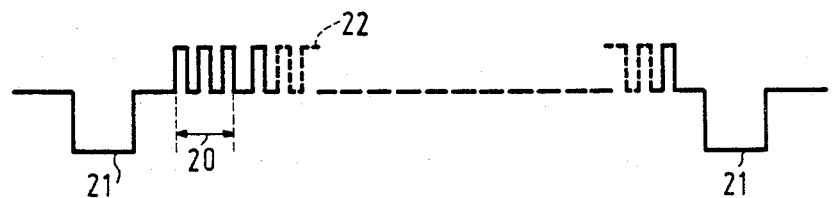
FIG. 2 shows an embodiment of a device for translating a binary coded data signal into a video signal.

In order to determine the correct sampling phase, a well-defined recognition pattern is added to a data block. This is necessary because the synchronization signals could be shifted slightly with respect to the data block or vice versa. Due to the addition of such a recognition pattern, for example 10 10 01 01, a phase correction can be performed when the data is read again. FIG. 2 shows an example of a data block with an associated recognition pattern. Between two successive synchronization pulses 21 there are included a data block 22 and a recognition pattern 20. The recognition pattern 20 is arranged at the beginning of the data block 22 in the present example. However, it is alternatively possible to provide the recognition pattern at the end of, or spread across, the data block. The recognition pattern is generated by the recognition pattern generator 9 and is shifted into the register 3 simultaneously with the data block. To this end, the recognition pattern generator 9 is connected to the second output 13 of the divider 6 in order to receive said control pulses. It is alternatively possible to include the recognition pattern in the data signal applied to the first connection terminal 14.

It will be evident that it is alternatively possible to add the recognition pattern to the data for one television frame; the recognition pattern generator 9 is then controlled by the vertical synchronization signal. It is also possible to add the recognition pattern only to a limited number of television lines of a frame; in that case the recognition pattern generator 9 should again receive a suitable control signal.

Figure 3:
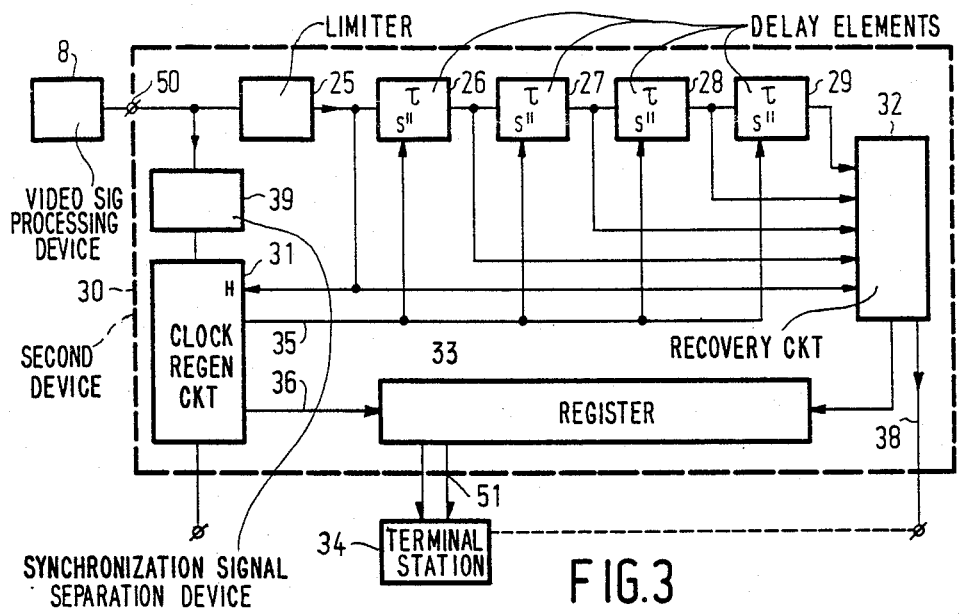
FIG. 3 shows an embodiment of a device for translating a video signal into a binary coded data signal.

FIG. 3 shows an embodiment of a device 30 for translating a video signal into a binary coded data signal, the device forming part of a video translation system in accordance with the invention. On an output of the video signal processing device 8 there is outputted a video signal which contains video data blocks, each video data block containing synchronization signals and several copies of one and the same data block. The video signal output of the video signal processing device 8 is connected to a second connection terminal 50 of the device, the second connection terminal 50 being connected to an input of a synchronization signal separation device 39 and also to a limiter 35. An output of the synchronization signal separation device 39 is connected to a clock regenerator 31.

An output of the limiter 25 is connected to an input H of the clock regenerator 31 and also to a first input of a first delay element 26 of a linear array of delay elements (26, 27, 28, 29) which form a shift register. The array of delay elements comprises as many delay elements as there are copies to be made of the original data block; consequently, the present embodiment comprises four delay elements. Each of the delay elements has a control input (S") connected to an output 35 of the clock regenerator 31. The output of every j$^{th}$ delay element ($1 \leq j \leq n-1$, n=total number of delay elements) is connected to the input of the j+1$^{th}$ delay element and also to an i$^{th}$ input of a recovery circuit 32. For every j$^{th}$ delay element there is provided one associated i$^{th}$ input. The last (n$^{th}$) delay element (29) of the array has its output connected to the first input of the recovery circuit 32. The recovery circuit comprises n+1 inputs and the (n+1)$^{th}$ input is directly connected to the output of the limiter 25. An output of the recovery circuit 32 is connected to a register 33 which itself is connected to a first connection terminal 51 to which a terminal station 34, for example a computer, is connected.

The device 1 (FIG. 1) and the device 30 may form one unit; the connection terminals 14 and 15 then are then same as the connection terminals 51 and 50 respectively.

The synchronization signal separation device 39 extracts the television synchronization signals from the video signal supplied by the video processing device 8, and applies the television synchronization signals to the clock regenerator 31 which regenerates the clock signal therefrom.

Figure 4:
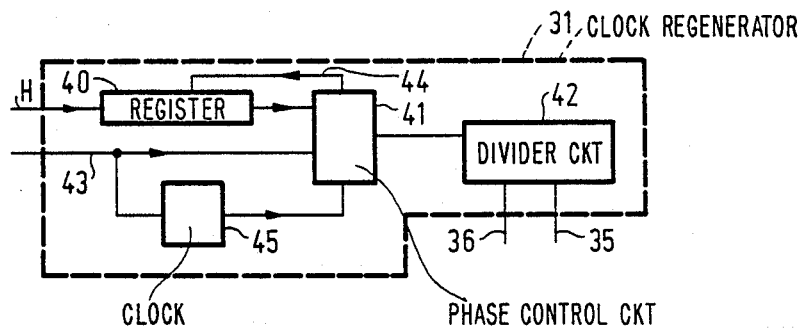
FIG. 4 shows an embodiment of a clock pulse regenerator.

FIG. 4 shows an embodiment of a clock pulse regenerator 31. Via a line 43, a synchronization signal originating from the synchronization signal separation device 39 (FIG. 5a) is received by a phase control circuit 41 as well as by a clock 45. The synchronization signal controls the clock 45. An input of a register 40 is connected to the input H of the clock pulse regenerator 31 in order to receive the bit signal which inter alia contains the recognition pattern. After having received a horizontal synchronization pulse, the phase control circuit 41 applies a control signal to the register 40 via a line 44. Under the control of this control signal, the recognition pattern is extracted from the bit signal in order to be stored in the register 40. The phase control circuit 41 has an input connected to an output of the register 40 and tests when the recognition pattern is received with respect to the recognition of a horizontal synchronization pulse. This test is performed, for example, by counting the number of block pulses issues by the clock 45 during the period between the reception of the horizontal synchronization pulse and the last bit of the recognition pattern. On the basis of this test a correction is thus made for a possible phase shift. The phase control circuit 41 presents the clock signal having the correct phase to a divider circuit 42 which acts as a shift pulse generator. This shift pulse generator generates first shift pulses for the delay elements 26, 27, 28 and 29. The first pulses are presented to the output 35. Furthermore, after every $(n+1)^{th}$ series of first shirt pulses, the divider circuit 42 also generates second shift pulses which are applied to the register 33 via an output 36.

Figure 5:
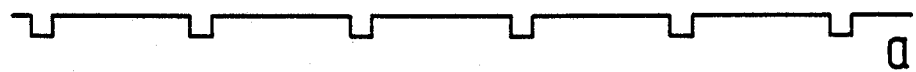
FIG. 5 shows a pulse pattern of controlling a device as shown in FIG. 3.

Each delay element of the array in this embodiment is formed by a shift register having a capacity which is sufficient for the storage of the data for one television line (16 bytes or 128 bits). Under the control of the first series of first shift pulses, the data bits are serially applied from the video signal produced by the video processing device to the delay element 26. After 128 first shift pulses (128 bits per television line) have been supplied by the clock pulse regenerator 31, the data bits of a first television line will be present in the delay element 26. As is shown in FIG. 5b, these 128 first shift pulses are generated between two successive horizontal synchronization pules (5a). Under the control of a next series of 128 first shift pulses, the bits are serially shifted from the delay element 26 to the delay element 27, the data of a next television line being applied to the delay element 26. Thus, under the control of a series of first shift pulses the data bits are shifted through each delay element of the array, while each time the data bits of a next television line are being input. The data bits of the first television line thus reach the delay element 29 utilizing four (n=4) series of first shift pulses in this embodiment. After the first television line has been shifted into the delay element 29, useful data is outputted by the recovery circuit 32 during the subsequent series of first shift pulses. In response to each shift pulse of this n+1 series of first shift pulses, the data bit present on the output of each of the delay elements as well as the data bit present on the output of the limiter 25 is presented to its associated input of the recovery circuit 32. The recovery circuit 32 comprises a known majority decision circuit 32. The recovery circuit recovers only one correct bit value from the n+1 data bits presented, said bit value being shifted into the register 33.

As has already been stated, n is preferably an even number, because n+1 is then an odd number, so that always a majority decision can be taken by the majority decision circuit 32. The recovery circuit thus recovers only one corresponding data block from the n+1 data blocks which are presented and which form part of a video data block, the data block corresponding substantially to the original data block. In addition to the recovery of a data block, the recovery circuit can also provides an error signal on a line 38 in order to indicate that an error has occurred in one of the n+1 data bits presented. It is alternatively possible to apply this error signal to the terminal station 34 for correction purposes.

Under the control of the second shift pulses (FIG. 5c), the data line then present in the register 33 is applied to the terminal station 34.

For the series of first shift pulses which do not amount to a multiple of (n+1) data bits originating from two different video data blocks are applied to the recovery circuit 32. In that case no useful data is outputted on the output of the recovery circuit. However, this is not a problem because the second shift pulses which control the register 33 ensure that each useless data is not applied to the terminal station. This set-up offers the advantage that no additional control data is required for the recovery circuit.

It will be evident that only a preferred embodiment has been described and that alternative solutions are feasible for the devices 1 (FIG. 1) and 30 (FIG. 2). For example, correction bits may be added to each data block. In that case the array of delay elements could comprise only one register and the recovery circuit could test, on the basis of the added correction bits, whether a data block from the video data block is corrected or incorrect in order to select only one correct data block from the n+1 data blocks.

What is claimed is:

1. A video translation system comprising in combination
   (a) a synchronization signal circuit generating television synchronization signals,
   (b) a first device having a first connection terminal for receiving binary coded data signals from a data source and being provided for translating a received binary coded data signal into a video signal, said first device comprising
      (i) a system of registers connected to said first connection terminal for receiving said binary coded data signals in the form of successive original data blocks and for storing temporarily each of said original data blocks, said system of registers having an input for receiving said television synchronization signals and comprising generating means for generating under control of associated television synchronization signals n copies of each of said original data blocks,
      (ii) a mixer comprising a first input connected to said system of registers for receiving each original data block and its n copies, said mixer having a second input for receiving said associated television synchronization signals and forming for each original data block a data set having a predetermined number (n+1) of data blocks and associated television synchronization signals, (iii) a video signal processing device connected to said mixer for receiving each of said data sets, (c) a second device connected to said video signal processing device for translating each data set into a binary coded data signal, said second device comprising:
  (i) a synchronization signal separating device for separating said associated television synchronization signals from each of said data sets received from said video signal processing device,
  (ii) a shift pulse generator connected to said synchronization signal separating device for receiving said separated television synchronization signals of each video data set, said shift pulse generator generating in response to said separated television synchronization signals of each video data set a series of first shift pulses and for generating a second shift pulse each time n+1 series of first shift pulses are generated,
  (iii) a recovery circuit including a majority circuit,
  (iv) shifting means connected to said shift pulse generator and to an input of said recovery circuit, said shifting means having an input for receiving each said video set originating from said video signal processing device, said shifting means being provided for shifting into said recovery circuit under control of said first shift pulses the n+1 data blocks comprising each received video data set, and
  (v) said recovery circuit receovering on the basis of a majority decision a corresponding binary coded data signal from each n+1 video data blocks in each received video data set and for outputting said corresponding binary coded data signal under control of a received second shift pulse.

2. A video translation system according to claim 1 wherein said recovery circuit includes a plurality of inputs equal in number to the predetermined number of data blocks in each data set.

3. A video translation system according to claim 2 wherein said shifting means includes a shift register connected to said majority decision circuit.

4. A video translation system according to claim 3 wherein said recovery circuit includes a further register connected to said majority decision circuit for storing recovered binary coded data signals said further register operating in response to said second shift pulses to output a recovered binary coded data signal.

5. A video translation system according to claim 1 wherein said synchronization signal circuit includes a television synchronization signal generator and a divider connected to said television synchronization signal generator, said divider generating first and second control signals and a control pulse in response to said television synchronization signals, and wherein said system of registers of said first device includes an input register connected to said divider, said input register receiving said original data blocks in response to said first control signals from said divider.

6. A video translation system according to claim 5 wherein said system of registers of said first device includes an end-around coupled register connected to said divider and said input register, said end-around coupled register receiving an original data block from said input register in response to said control pulse.

7. A video translation system according to claim 1 wherein said end-around coupled register is connected to said mixer and provides data blocks thereto in response to said second control signals, said end-around coupled register including a serial input for receiving data blocks provided to said mixer for generating said at least one copy of each said original data block.

* * * * *